United States Patent
Woods et al.

(10) Patent No.: US 6,722,994 B2
(45) Date of Patent: Apr. 20, 2004

(54) SUSPENDED DRIVE AXLE AND AGRICULTURAL TRACTOR WITH SAME

(75) Inventors: Terrill Wayne Woods, Sierra Vista, AZ (US); Dennis Aaron Bowman, Cedar Falls, IA (US); Mervin Peter Kizlyk, Cedar Falls, IA (US); Norman Frederick Lemmon, Cedar Falls, IA (US); Kendall Lee Giesmann, Waverly, IA (US); Aaron James Peterson, Waterloo, IA (US); George Nick Schmitz, Waterloo, IA (US); Peter Alan Kosmicki, Cedar Falls, IA (US); Joe L. Schutte, Denver, IA (US); William Guy Alexander, Waterloo, IA (US); Christopher Alan Schafer, Traer, IA (US); Dennis Lee Jeffries, Waterloo, IA (US); Jeffrey Kahle Brown, Cedar Falls, IA (US)

(73) Assignee: Deer & Co., Moline, IL (US)

( * ) Notice: Subject to any disclaimer, the term of this patent is extended or adjusted under 35 U.S.C. 154(b) by 42 days.

(21) Appl. No.: 09/802,666

(22) Filed: Mar. 9, 2001

(65) Prior Publication Data

US 2002/0125056 A1 Sep. 12, 2002

(51) Int. Cl.[7] ................................................. F16D 3/16
(52) U.S. Cl. ...................... 464/114; 464/112; 464/905; 180/359
(58) Field of Search ................................. 180/359–361, 180/254, 256, 257, 900, 905, 906; 280/124.135, 124.136, 124.138, 124.139, 124.141; 464/112, 113, 114, 117, 906, 905; 475/225

(56) References Cited

U.S. PATENT DOCUMENTS

| | | | | |
|---|---|---|---|---|
| 1,379,770 A | * | 5/1921 | Lucand | 180/355 |
| 2,476,473 A | | 7/1949 | Ashton | |
| 2,546,453 A | * | 3/1951 | Koenig | 180/906 |
| 2,901,051 A | | 8/1959 | Thibodeau | |
| 3,283,842 A | | 11/1966 | Watt | |

(List continued on next page.)

FOREIGN PATENT DOCUMENTS

| | | |
|---|---|---|
| DE | 199 52 313 A1 | 5/2000 |
| JP | 63 258206 A | 10/1988 |

OTHER PUBLICATIONS

SAE Technical Paper Series, 801020, Agricultural Tractor Chassis Suspension System for Improved Ride Comfort, 36 pages dated 1980.

Primary Examiner—Paul N. Dickson
Assistant Examiner—Ruth Ilan

(57) ABSTRACT

A suspended drive axle and agricultural tractor having same including a central housing having inboard final drives and left and right axle housing suspended therefrom by upper and lower control arms with axle shafts extending outwardly therefrom to which wheel and tire assemblies are mounted. A constant velocity universal joint is provided between the inboard final drives and the axle shafts. The universal joint having a pair of journal members and a coupling yoke that radially surround the drive and driven yokes of the joint whereby the axial length of the universal joint is minimized to enable the wheels to be located on the axle shafts at 60 inch tread spacing. This allows the drive axle to be used on a row crop tractor without altering the structure of the vehicle from a conventional row crop tractor whereby the characteristics of a row crop tractor are maintained.

4 Claims, 15 Drawing Sheets

U.S. PATENT DOCUMENTS

| | | | |
|---|---|---|---|
| 3,453,842 A | | 7/1969 | Rethwisch |
| 3,456,458 A | | 7/1969 | Dixon |
| 3,924,420 A | | 12/1975 | Falk |
| 3,965,700 A | | 6/1976 | Nicoletti |
| 4,073,358 A | * | 2/1978 | Szalai ................ 180/372 |
| 4,080,804 A | | 3/1978 | Falk |
| 4,121,437 A | | 10/1978 | Michel |
| 4,257,243 A | | 3/1981 | Herchenbach |
| 4,436,515 A | | 3/1984 | Mallet |
| 4,540,383 A | | 9/1985 | Taig |
| 4,623,868 A | * | 11/1986 | Pitcher ................ 338/160 |
| 4,744,264 A | | 5/1988 | Milenkovic |
| 4,750,751 A | * | 6/1988 | Schafer ................ 180/41 |
| 4,826,203 A | * | 5/1989 | Kijima et al. ......... 280/124.109 |
| 4,838,830 A | | 6/1989 | Heinemann |
| 4,907,937 A | | 3/1990 | Milenkovic |
| 4,943,262 A | | 7/1990 | Schultze |
| 5,031,934 A | * | 7/1991 | Soltis ................ 280/6.157 |
| 5,094,651 A | | 3/1992 | Cornay |
| 5,271,632 A | | 12/1993 | Glaser et al. |
| 5,419,740 A | | 5/1995 | Koyari et al. |
| 5,525,110 A | | 6/1996 | Riccitelli et al. |
| 5,536,219 A | * | 7/1996 | Umemoto et al. ......... 475/225 |
| 5,538,264 A | | 7/1996 | Brown et al. |
| 5,597,172 A | | 1/1997 | Maiwald et al. |
| 5,643,090 A | | 7/1997 | Smith |
| 5,647,802 A | | 7/1997 | Gleasman et al. |
| 5,718,633 A | | 2/1998 | Gehrke |
| 5,879,016 A | | 3/1999 | Altherr et al. |
| 5,897,287 A | * | 4/1999 | Berger et al. ............... 414/699 |
| 5,931,486 A | | 8/1999 | Andreis |
| 5,954,586 A | | 9/1999 | Kirson |
| 6,015,155 A | * | 1/2000 | Brookes et al. .......... 280/5.504 |
| 6,105,984 A | * | 8/2000 | Schmitz et al. ............. 180/256 |
| 6,120,407 A | * | 9/2000 | Mimura ..................... 475/205 |
| 6,131,919 A | * | 10/2000 | Lee et al. ..................... 180/41 |
| 6,145,859 A | | 11/2000 | Altherr et al. |
| 6,148,945 A | * | 11/2000 | Alessandro et al. ........ 180/252 |
| 6,322,090 B1 | * | 11/2001 | Chignoli et al. ............ 180/209 |

* cited by examiner

SUSPENDED DRIVE AXLE AND AGRICULTURAL TRACTOR WITH SAME

BACKGROUND OF THE INVENTION

1. Field of the Invention

The present invention relates to an agricultural tractor with a suspended drive axle and in particular to a tractor having an independent rear suspension.

2. Description of the Related Art

An agricultural tractor is intended primarily for off-road usage and is designed primarily to supply power to agricultural implements. An agricultural tractor propels itself and provides a draft force in the direction of travel to enable an attached, soil engaging implement to perform its intended function. Furthermore, an agricultural tractor may provide mechanical, hydraulic and/or electrical power to the implement. Agricultural tractors must be designed with sufficient normal force, down force, acting on the drive wheels to produce the needed draft force. Typically, in a two-wheel drive tractor, this results in a vehicle having rear drive wheels that are larger than the front wheels to accommodate the required normal force on the rear drive wheels. Agricultural tractors differ from cargo carrying vehicles, such as pickup trucks and semi-truck tractors, in that trucks do not need to produce a continuous draft load. A truck produces a draft load only during periods of acceleration and deceleration and relies on the weight of the cargo carried by the drive wheels to produce the draft load.

The productivity of an agricultural tractor can be increased by faster travel speeds in the field and on the road. A significant limiting factor to the travel speed of an agricultural tractor is the comfort of the operator when travelling over rough surfaces. A typical tractor has an integrated structure in which the rear axle and hitch are integrated into one unit and forms a part of the vehicle frame structure. In such a case, there is no suspension between the rear axle and the tractor frame. Tire deflection alone provides a cushioning between a rough surface and the tractor frame. Seat suspensions and cab suspensions have also been used with limited success to improve operator comfort.

The front axle, which may or may not be driven, is typically a beam axle pivotally mounted to the tractor for limited rotation about a longitudinal axis. Suspended front axles have been developed for tractors such as that shown in U.S. Pat. No. 5,879,016. There, a rigid beam axle having outboard planetary final drives is suspended from the tractor frame. Suspended front axles have provided improved comfort for operators.

However, due to the lack of a rear suspension, significant loads caused by an uneven terrain are still transmitted to the vehicle frame and to the vehicle operator. Tractor speed, particularly in the field, is limited by the jostling of the operator. Operator fatigue occurs sooner the more the operator is jostled in the cab. Thus there exists a need for a rear suspension in an agricultural tractor to reduce operator fatigue, thereby allowing the operator to productively work longer hours and/or to operate at a faster travel speed.

One attempt at providing a rear suspension is shown in U.S. Pat. No. 5,538,264. There, a rear beam axle is suspended from the tractor frame. To include the suspension, the tractor design deviates from a conventional row crop tractor of comparable power in at least the following respects: 1) the rear axle is equipped with outboard final planetary drives instead of inboard final drives; 2) the tractor is equipped with four equal sized tires, all smaller than the large rear tires on a conventional row crop tractor of comparable power; and 3) the rear axle is moved substantially rearward relative to the tractor cab, as compared to a conventional row crop tractor.

The outboard final drives limit the adjustability of the tread width and prevent the tread width from being infinitely adjustable along the axle. Only discrete changes in the tread width are available through different wheel and rim configurations. Of the commercially available tractors embodying the invention of the U.S. Pat. No. 5,538,264, only the lowest power tractors are available with a tread width as narrow as 60 inches. The smaller tires have a lower load carrying capability, resulting in less traction. The rearward location of the rear axle relative to the cab interferes with visibility of the hitch by the operator. An additional disadvantage of this design is that the tractor hitch is carried by the suspended axle, and is thus part of the unsprung mass. The lack of a suspension for the hitch results in towed implements following the vertical motion of the tires and axle as opposed to the more steady movements of the tractor frame. A further disadvantage is that the beam axle does not enable an independent suspension.

As a result of all the differences between the tractor of the '264 patent and a conventional row crop tractor, the '264 tractor does not achieve the same level of performance of a comparable power row crop tractor. The tractor of the '264 patent does allow increased travel speeds, both in the field and on the road, but at a significant 'cost' in terms of performance in the field. The tractor of the '264 patent is designed more for use as a hauling vehicle and for road transport than for field work pulling a soil engaging implement. Accordingly, there still exists a need for a row crop tractor having a rear suspension while maintaining the performance and operational characteristics of a row crop tractor of comparable power with a rigid, non-suspended, rear drive axle.

A row crop agricultural tractor is designed to operate in the field with the tread width set for the wheels to travel between rows. Conventionally, this has meant a tractor with a tread width as narrow as 60 inches, enabling the tractor to straddle two crop rows spaced 30 inches apart. The tread width is adjustable so that it can be customized for a particular farm application with row spacings other than 30 inches. Infinite adjustability can be provided by wheel hubs that clamp to an axle at any location along a length of the axle. This type of adjustment mechanism necessitates an inboard planetary final drive. Other adjustment mechanisms involve changing the wheel rim and disc configuration to change the tread width.

Small row crop tractors such as the JOHN DEERE 6010 Series tractors have power ratings ranging between 49 kW to 71 kW (65–95 hp). Large row crop tractors such as the JOHN DEERE 8010 series tractors range in power from 123 kW to 175 kW (165 to 235 hp). These tractors all have inboard final drives to enable an infinitely adjustable tread width. In the JOHN DEERE 8010 series tractors, the width of the rear differential case, between the inboard planetary final drives, is 665 mm (26.2 inches). A rear suspension must be packaged outboard of the final drive and inboard of the wheel mounting equipment at a 60 inch tread width to maintain the same row-crop capabilities in a suspended tractor of this size as in the non-suspended tractor.

SUMMARY OF THE INVENTION

The tractor of the present invention maintains the transmission, rear differential and inboard planetary final drive assembly of a comparable sized row crop tractor without a rear suspension. The tractor of the present invention provides left and right suspended axle housings each coupled to the final drive housing by a pair of suspension control arms and one or more spring assemblies. Left and right axle shafts are carried by the suspended axle housings and are coupled to the final drive outputs by a constant velocity joint, such as a double cardan joint. The constant velocity joint is configured with the end of the final drive output closely spaced from the inboard end of the axle shaft. The remainder of the joint, the two journal members and the connecting link, are larger in diameter and radially surround the shaft ends. This arrangement of the joints reduces the axial length of the universal joint to a minimum, to enable the suspension to be packaged in the narrow space available. A relatively large constant velocity joint is needed since it is downstream of the final drive thus transmitting a large torque.

The fixed axle housing of a non-suspended axle, which extends outward from the final drive, is replaced by an inner suspension housing, fixed to the differential case. The upper and lower control arms extend from the inner suspension housing to the suspended axle housing. The axle shaft is supported by the axle housing and extends outwardly therefrom. Wheels are mounted to the left and right axle shafts in the same manner as in a non-suspended axle, providing infinite tread width adjustability. Dual tire capability is also maintained. One or more spring assemblies extending between the inner suspension housing and the axle housing allow the axle housing to resiliently move up and down relative to the tractor frame. By mounting the suspension to the differential case in place of the fixed axle housing of a non-suspended axle, a suspension axle is produced with only a few modifications to a non-suspended axle. As a result, a manufacturer can economically offer both suspended and non-suspended tractor models.

DESCRIPTION OF THE PREFERRED EMBODIMENT

Figure 1:
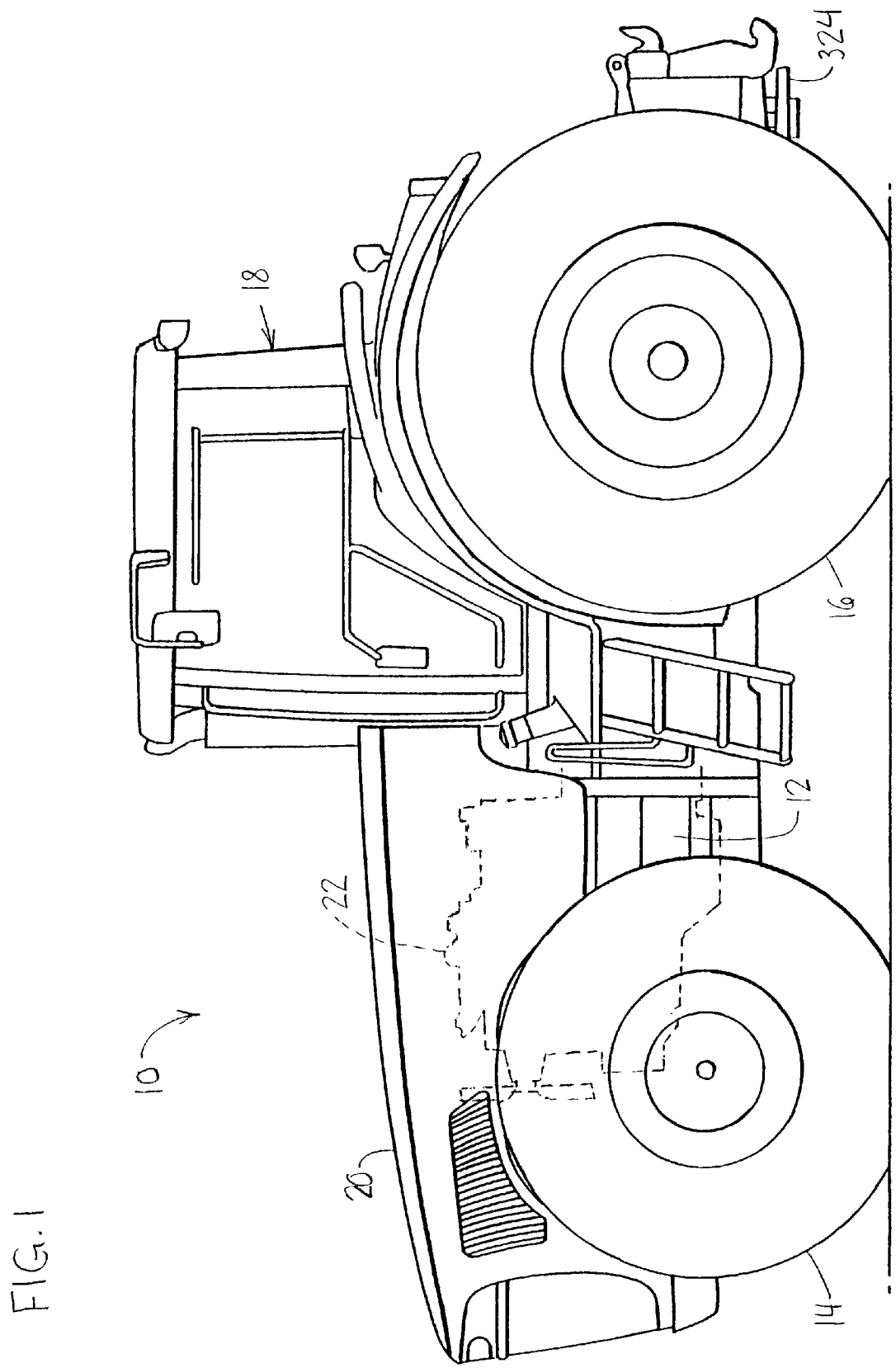
FIG. 1 is a side view of a row crop tractor.

An agricultural row crop tractor 10 is shown in FIG. 1. The tractor 10 includes a frame 12, front tire and wheel assemblies 14, rear tire and wheel assemblies 16 and an operator station 18, including a cab. A hood 20 covers an engine 22.

Figure 2:
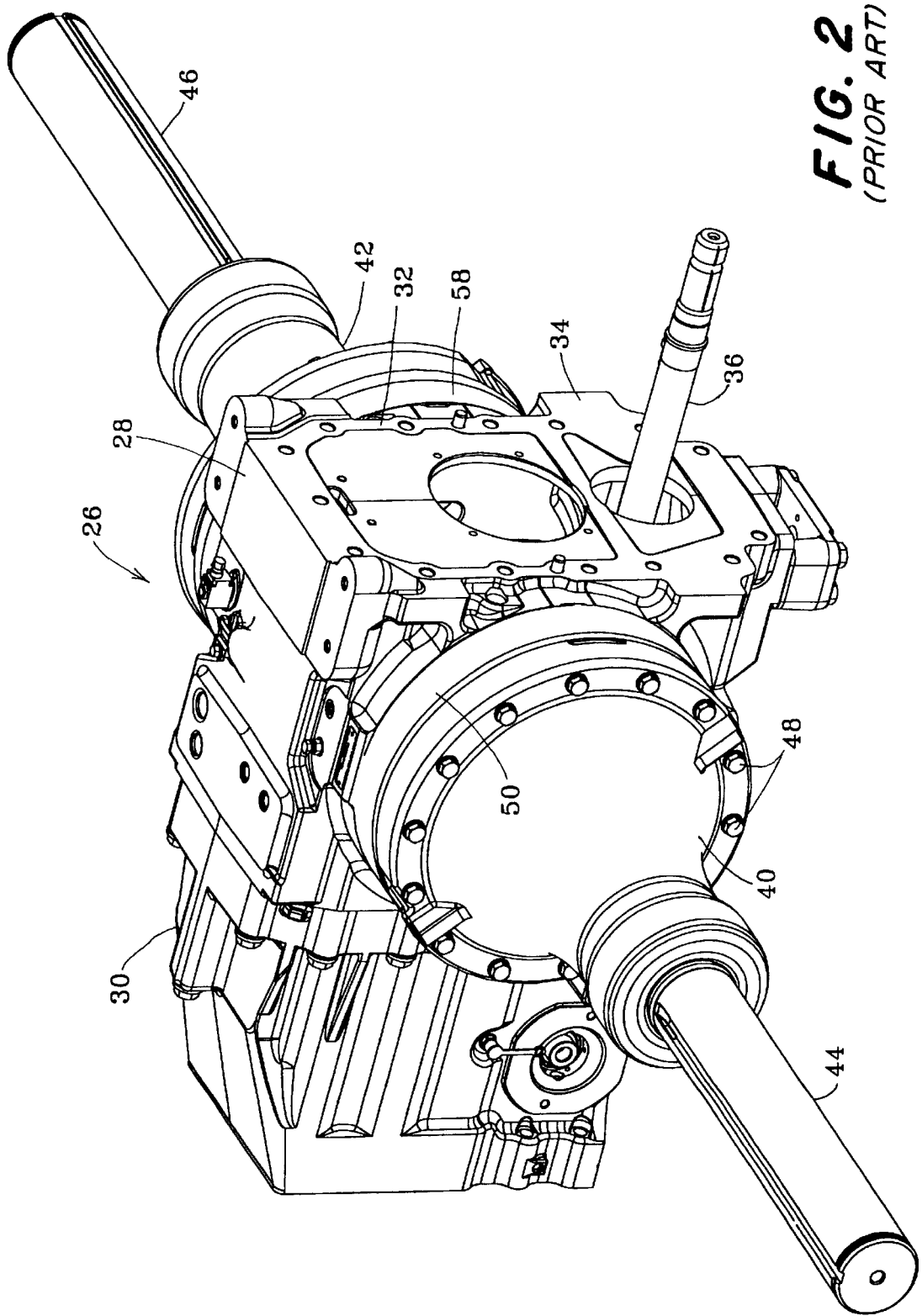
FIG. 2 is a rear perspective view of a non-suspended rear drive axle for the tractor of FIG. 1.
Figure 3:
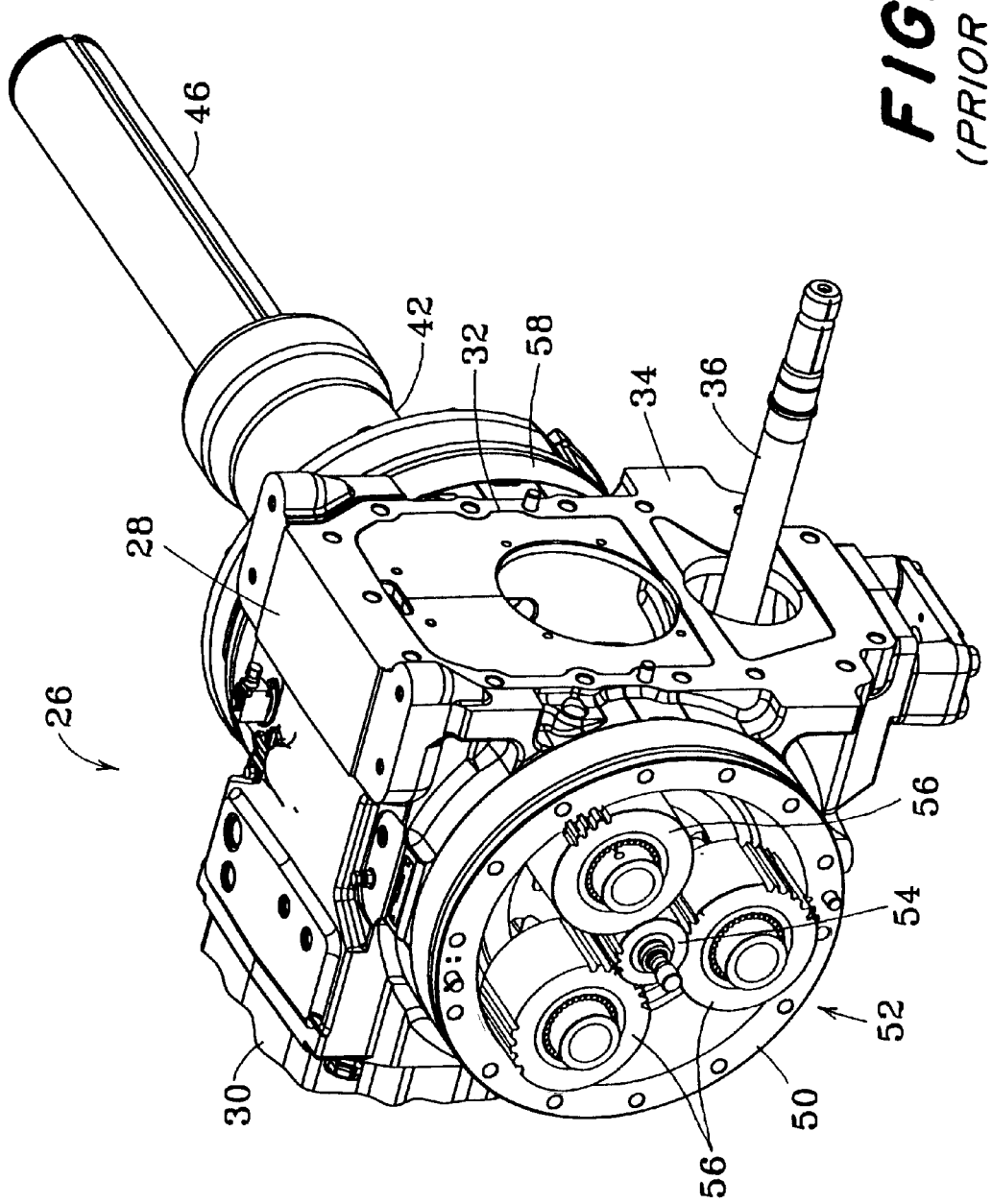
FIG. 3 is a rear perspective view of the non-suspended rear drive axle shown in FIG. 2 with the left side axle housing removed to illustrate the inboard planetary final drive.

With reference to FIGS. 2 and 3, a non-suspended rear drive axle assembly 26 for the tractor 10 is shown. The rear drive axle assembly includes a differential case 28 mounted to a transmission housing 30 and located rearward thereof. The differential case and transmission housing are part of the powertrain and are rigidly secured to the tractor frame 12 and become a part of the frame 12. The differential case is thus part of the tractor structure. A three-point hitch (not shown) is mounted to the upper portion 32 of the rear face of the differential case while a PTO housing (not shown) is mounted to the lower portion 34 of the rear face. The rearwardly extending shaft 36 drives the PTO.

Left and right axle housings 40, 42 support axle shafts 44, 46 extending to the left and right. The rear tires 16 are mounted to the axle shafts 44, 46. The left axle housing 40 is mounted to the differential case through a plurality of bolts 48. The axle housing 40 is bolted to the ring gear 50 of the left inboard planetary final drive 52 (FIG. 3). The planetary final drive includes a driven sun gear 54, a plurality of planet gears 56 and the stationary ring gear 50 that forms part of the differential case. A planet carrier 172, shown in FIGS. 10 and 11, supports the planet gears 56. The carrier is splined to the axle shaft 44 to drive the axle shaft as the planet gears 56 travel around the ring gear 50. A right planetary final drive assembly includes the same components as the left planetary final drive assembly 52. Only the ring gear 58 of the right final drive is shown.

The Suspension

Figure 4:
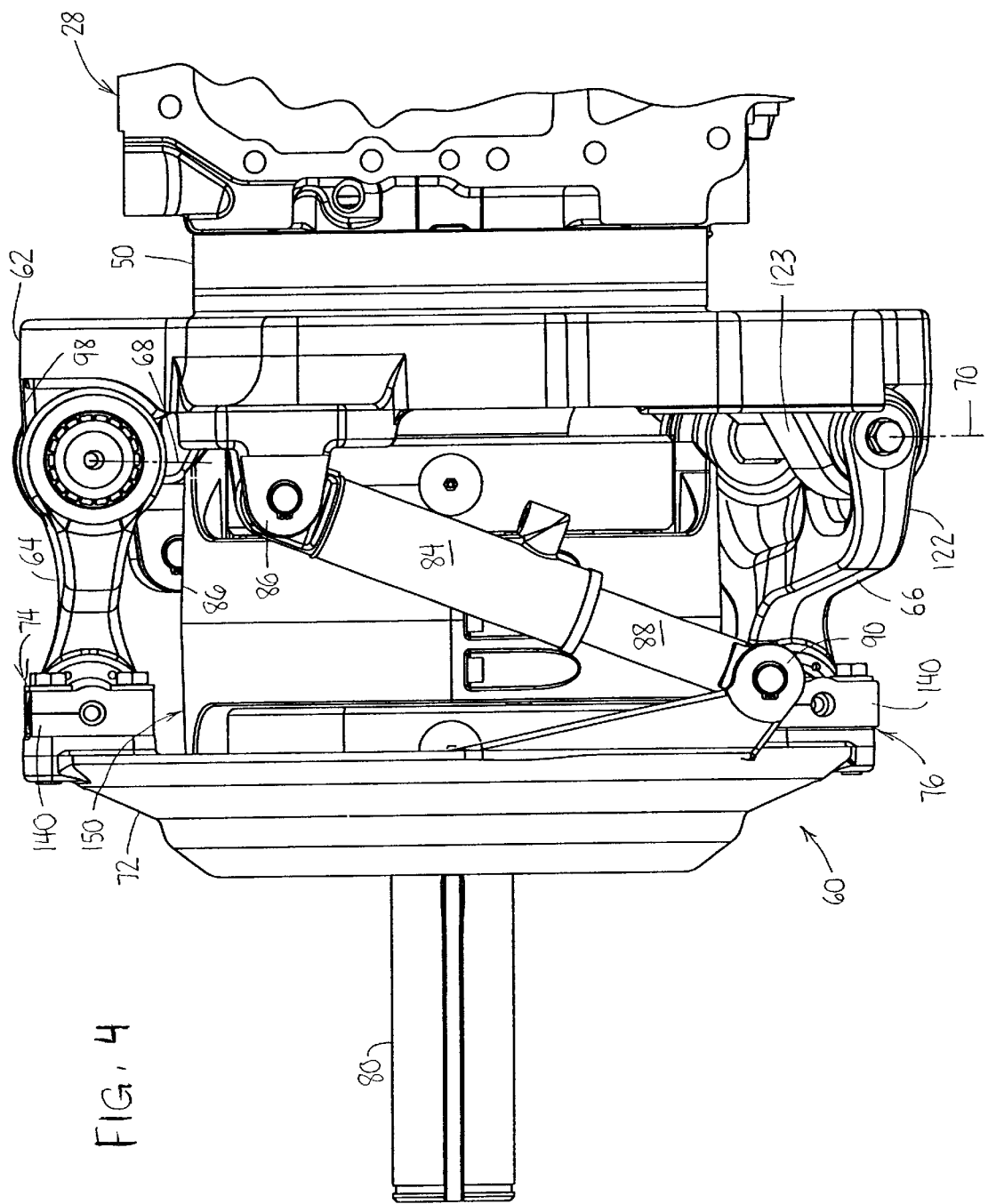
FIG. 4 is a rear view of the left side suspension system of the present invention mounted to the differential case of the rear axle shown in FIGS. 2 and 3.
Figure 7:
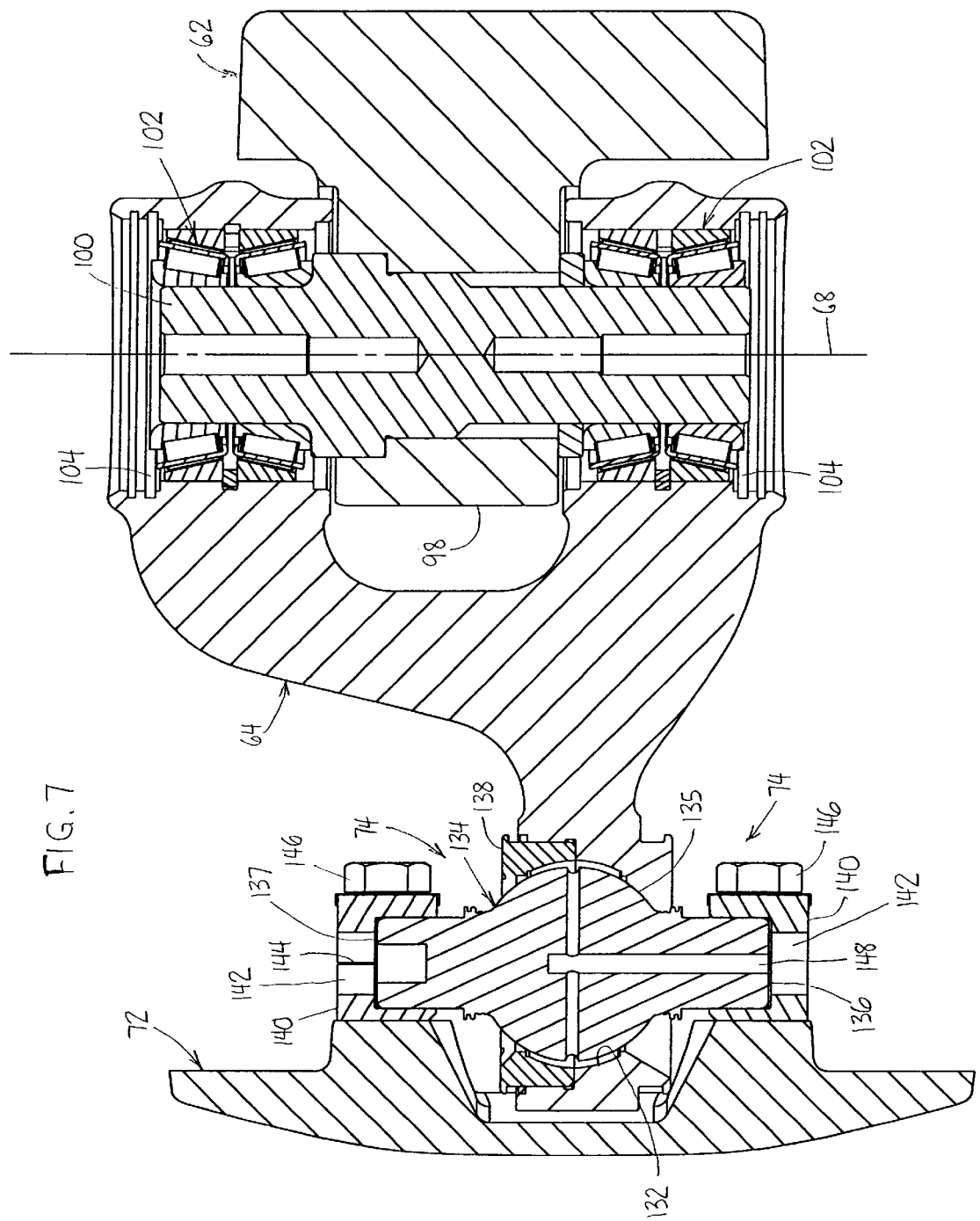
FIG. 7 is a sectional view through the suspension upper control arm.
Figure 8:
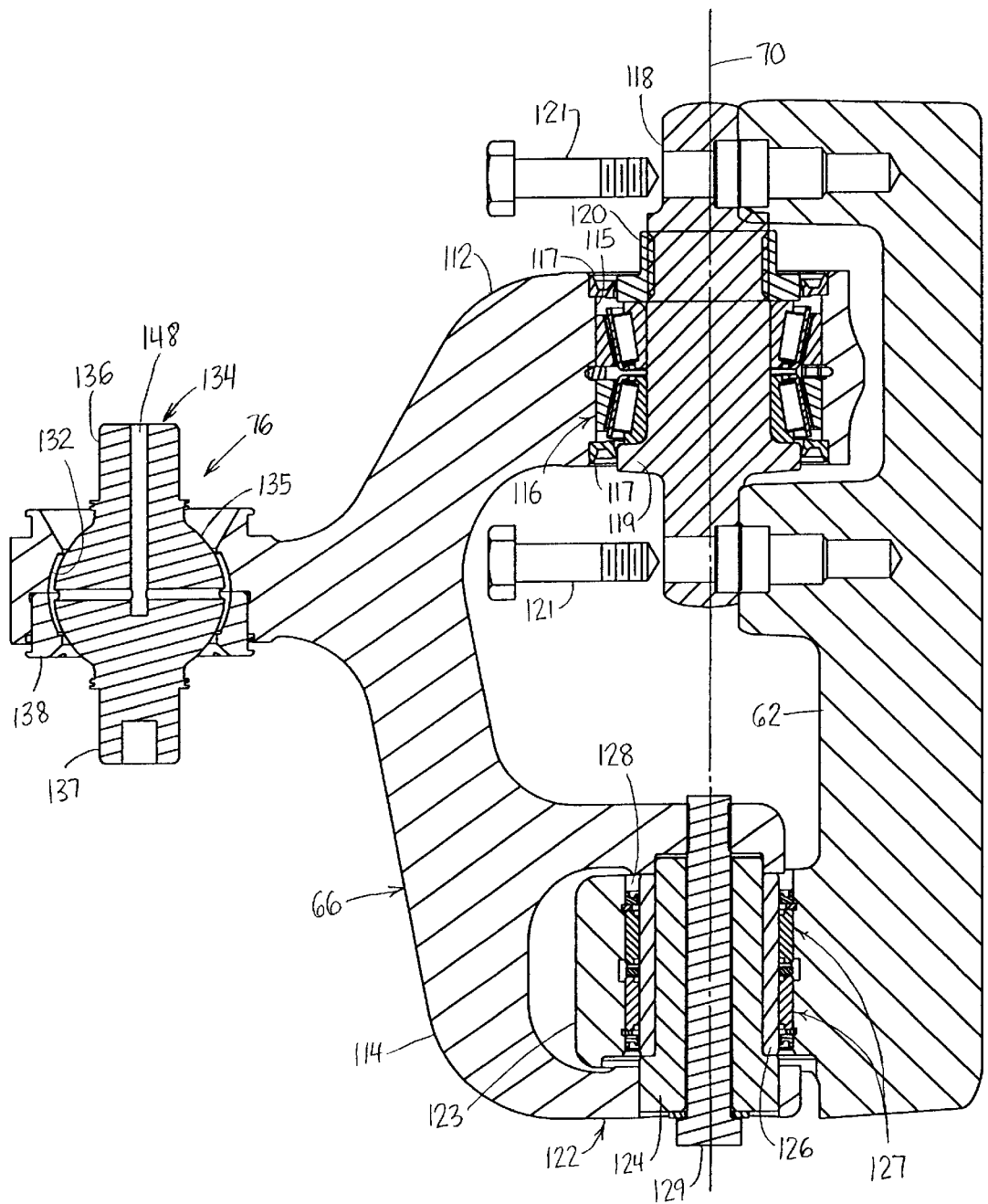
FIG. 8 is a sectional view through the suspension lower control arm.

The suspension of the present invention is illustrated in FIG. 4 where only the left side is shown. A substantially identical suspension is provided on both the left and right sides of the tractor. The assembly 60 includes an inner suspension housing 62 bolted to the final drive ring gear 50 in place of the axle housing 40 of the non-suspended axle shown in FIG. 2. Upper and lower control arms 64, 66 are mounted to the inner suspension housing 62 for pivotal motion about upper and lower axes 68, 70 (FIGS. 7 and 8). At their outer ends, the control arms support an axle housing 72 through upper and lower ball joints 74, 76. The couplings of the upper and lower control arms to the inner suspension housing and to the axle housing are shown in greater detail with reference to FIGS. 7 and 8.

The differential case, the final drive ring gears and the left and right inner suspension housings 62 form a ridged body also referred to herein as a central housing. The central housing is attached to the tractor frame and is part of the frame structure to which other vehicle components, such as the cab, are mounted.

An axle shaft 80 is rotatably carried by the axle housing 72 and extends laterally outwardly therefrom. The rear wheels and tires 16 of the tractor are mounted to the axle shaft 80 as described below.

Vertical loads are transmitted between the inner suspension housing and the axle housing by front and rear hydraulic cylinders 82, 84. The cylinders 82, 84 are each coupled to the inner suspension housing through a clevis 86 while the cylinder rods 88 are each coupled to the axle housing 72 by a clevis 90. The devises 86, 90 can be integral with the inner suspension housing and the axle housing or separate items attached thereto.

Figure 5:
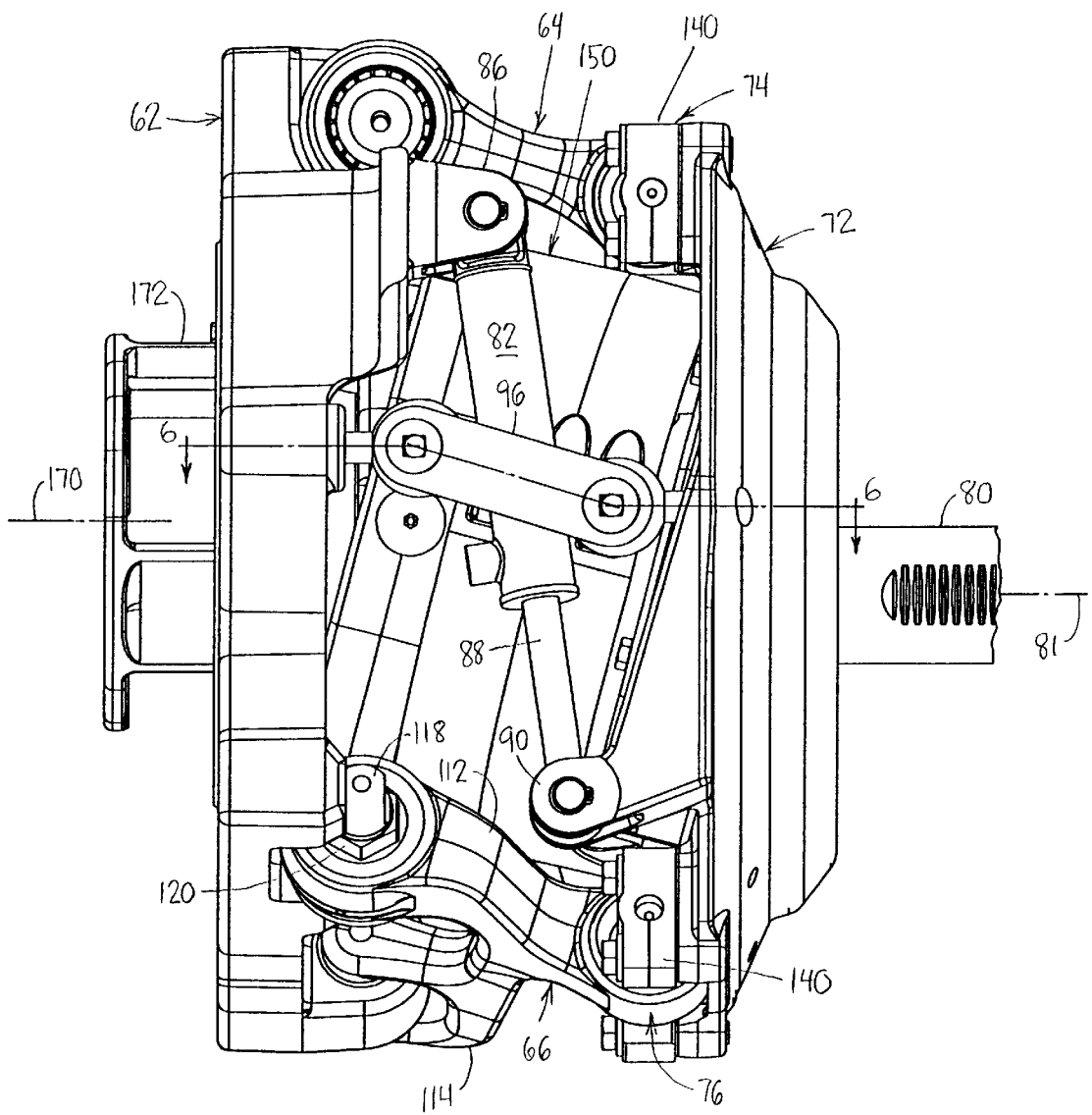
FIG. 5 is a front view of the left suspension system shown in FIG. 4.

FIG. 4 shows the suspension 60 from the rear with the suspension components in a nominal, or centered, position relative to the tractor frame. FIG. 5 shows the suspension from the front with the rods 90 of the cylinders 82, 84 extended. This places the axle shaft 88 in a lowered position relative to the chassis as would occur when the left tire encountered a rut or depression in the ground surface. The axle shaft 80 is lower than the axis 170 of the planet carrier 172. The upper and lower control arms 64, 66 are downwardly inclined, as is the universal joint 150.

Figure 6:
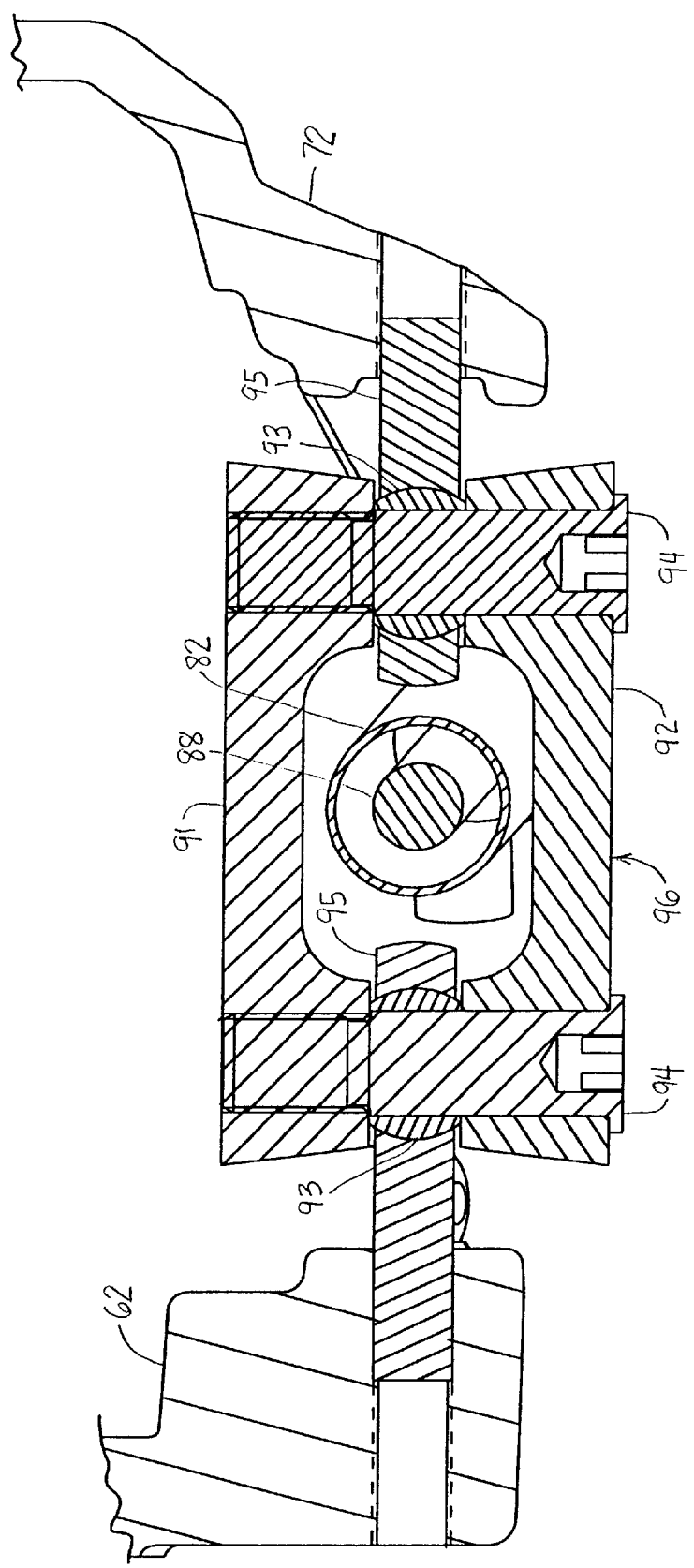
FIG. 6 is a cross sectional view through the connecting link as seen from substantially the line 6—6 of FIG. 5.

The axle housing 72 is coupled to the distal ends of the upper and lower control arms by upper and lower ball joints 74, 76, respectively, as described in more detail below. The ball joints allow the axle housing 72 to pivot about a generally upright axis passing through the ball joints. To prevent this pivoting motion and keep the rear tires aligned with the tractor fore and aft longitudinal axis, a fixed length connecting link 96 is coupled to the inner suspension housing and the axle housing on the front side of the suspension (FIGS. 5 and 6). The connecting link 96 prevents pivotal motion of the axle housing 72 about the upright axis passing through the ball joints 74, 76.

The structure and attachment of the connecting link 96 is shown in FIG. 6. The link 96 is made of two halves 91, 92 that surround the front hydraulic cylinder 82. The halves are fastened to pivot balls 93 by shoulder bolts 94. The pivot balls 93 are fixed in sockets in mounting studs 95. The studs 95 are threaded into the inner suspension housing 62 and the axle housing 72. The ball and socket connections enable the connecting link to pivot relative to the inner suspension housing and the axle housing as the axle housing 72 moves up and down.

The upper control arm 64 is shown in greater detail with reference to FIG. 7. The inner end of the control arm is forked, forming a clevis that surrounds a mounting boss 98 of the inner suspension housing 62. A pivot pin 100 is press fit into the boss 98. A bearing set 102 in each fork of the clevis surrounds the pivot pin 100. Snap ring grooves 104 are formed in each fork of the clevis to receive a snap ring to retain the bearings. The pivot pin 100 defines the upper axis 68.

Figure 9:
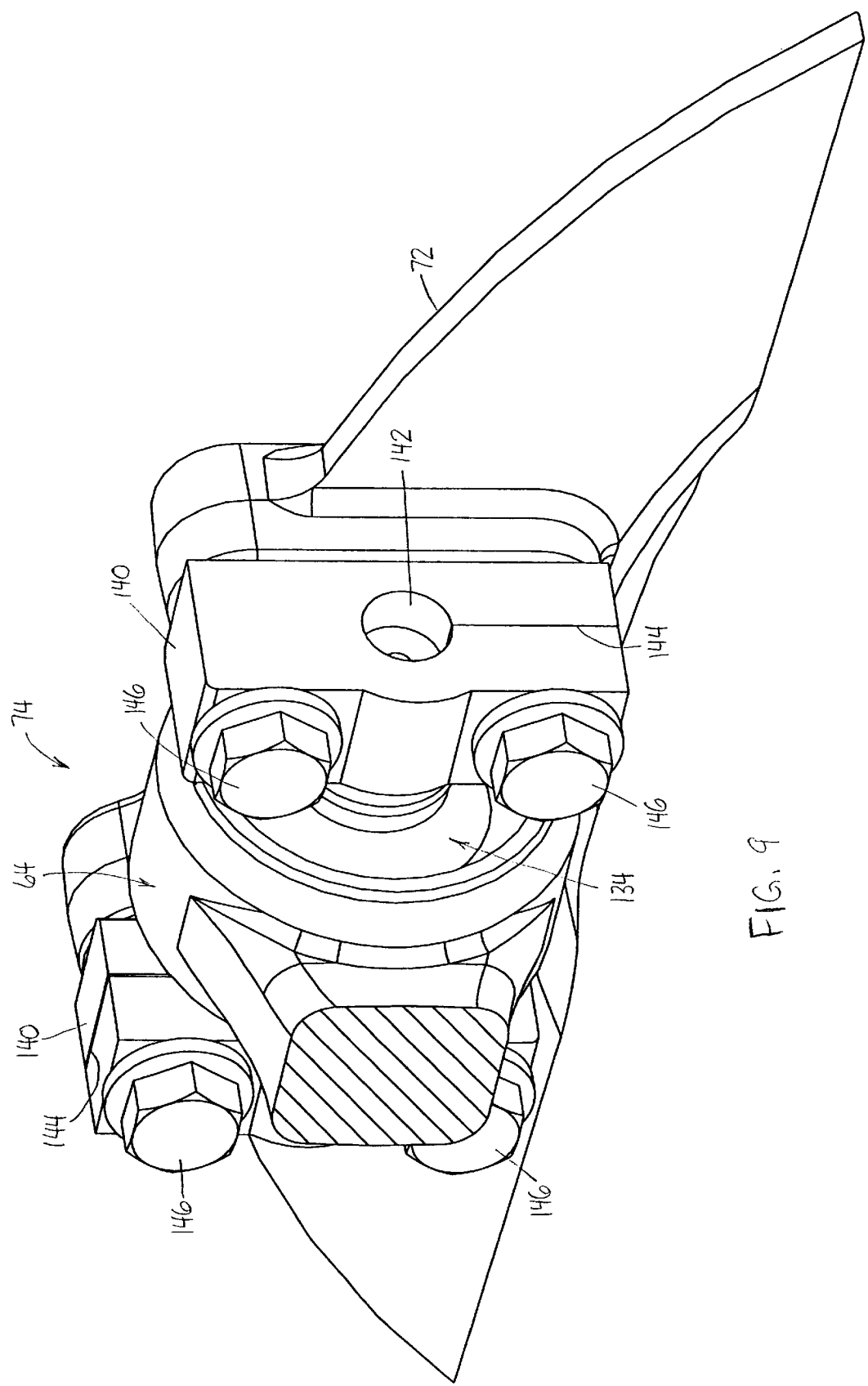
FIG. 9 is a fragmentary view of the ball joint attachment of the upper control arm to the outer suspension housing.

The upper and lower ball joints 74, 76 at the outer ends of the control arms are shown with reference to FIGS. 7, 8, and 9. The ball joints include a spherical socket 132 in the control arms at the distal ends thereof. A ball stud 134 has a spherical ball portion 135 and oppositely extending studs 136, 137. The ball stud 134 is retained in the socket 132 by a treaded collar 138 in a known manner for a ball joint.

A pair of identical mounting blocks 140 (FIG. 9) attaches the ball studs to the axle housing 72. The mounting blocks each have a cross bore 142 that receives one stud of the ball stud 134. Each mounting block 140 has a slot 144 extending outward from the bore 142. Through bores transverse to the cross bore 142 receive bolts 146 that attach the mounting blocks to the axle housing 72. The bolt 146 passing through the slot 144 clamps the mounting block onto the stud to fix the ball stud 134 from rotation. The ball stud, together with the mounting blocks and outer suspension housing, is allowed to pivot within the socket 132 at the end of the control arm. An internal passage 148 in the ball stud 134 allows the ball joint to be lubricated. A grease fitting, not shown, is placed in the passage 148 at the end of the stud 136.

The lower control arm is generally Y shaped having front and rear legs 112, 114 separately attached to the inner suspension housing 62. The front leg 112 has a bore 115 therein which receives a doubled tapered roller bearing set 116 and seals 117. A mounting pin 118 extends through the bearing set and is held in the bearings by a shoulder 119 at one end of the pin 118 and a nut 120 at the other end. A pair of bolts 121 fixes the pin 118 to the inner suspension housing 62.

The rear leg 114 is forked, forming a clevis 122 that surrounds a mounting boss 123 of the inner suspension housing 62. A pivot pin 124, a bushing 126 and a needle bearing set 127 are mounted in a bore 128 in the boss by a bolt 129. The end of the bolt 129 is threaded into one side of the clevis 122. The two pivot couplings of the lower control arm to the inner suspension housing define the lower axis 70. The outer distal end of the lower control arm carries the ball joint assembly 76 which is substantially identical to the upper ball joint assembly 74 described above.

Figure 10:
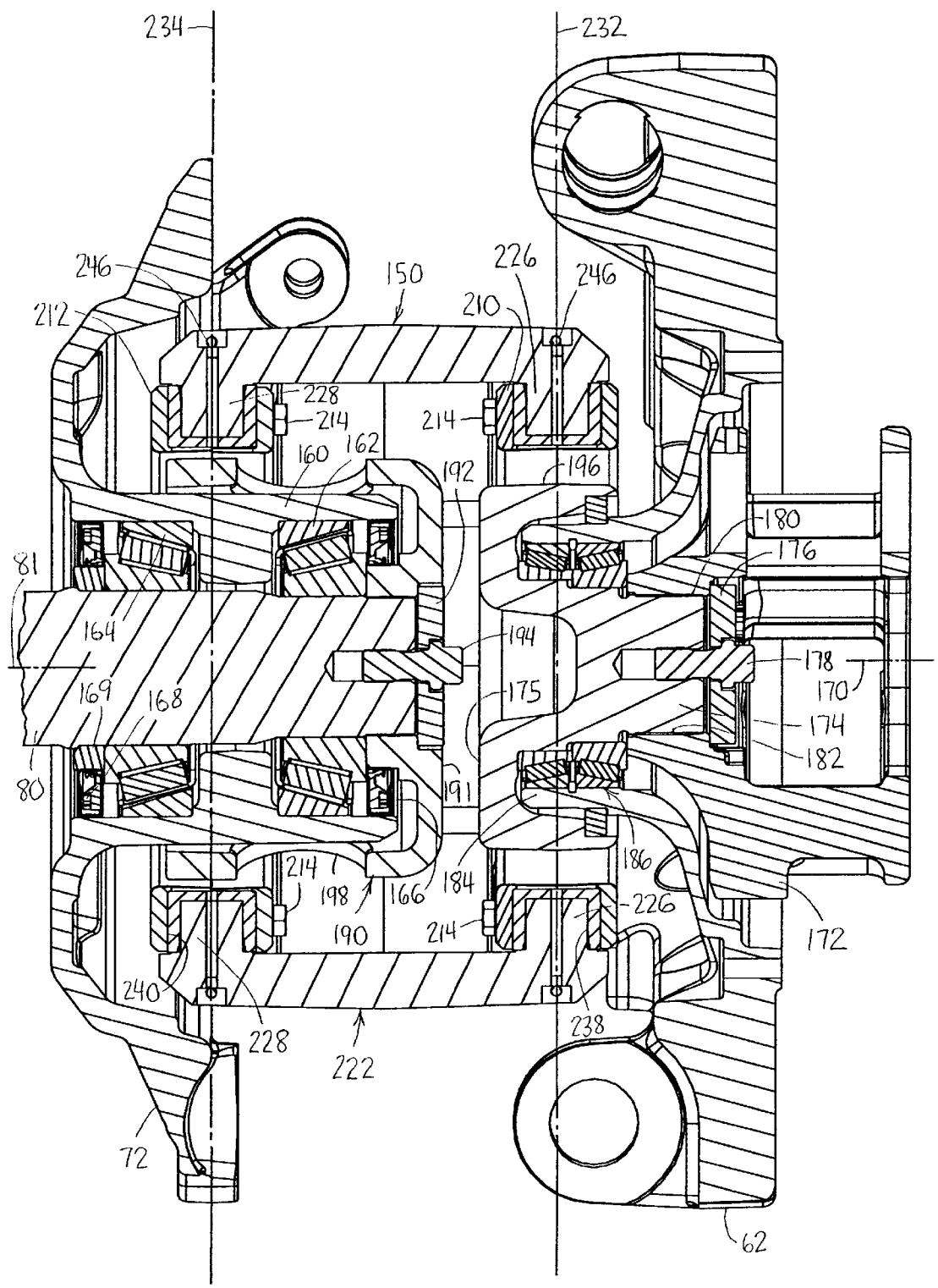
FIG. 10 is a cross sectional view of the universal joint connecting the planetary final drive to the axle shaft.

The mounting of the axle shaft 80 into the axle housing is shown in greater detail with reference to FIG. 10. The axle housing 72 has an inwardly projecting center hub 160 that carries inner and outer tapered roller bearings 162, 164. The axle shaft 80 is rotatably supported in the axle housing 72 by the bearings 162, 164. Seals 166, 168 seal the bearings. The seal 168 engages a ring 169 on the axle shaft 80.

The left and right sides of the suspension are mechanically separate from one another whereby one side can move without mechanically causing the other side to move. As described below, in the preferred embodiment the hydraulic cylinders are cross-linked left to right such that movement on one side will have an effect on the opposite side. If desired, the left and right cylinders can be separated from one another.

The Universal Joint

Rotational power is transmitted from the planetary final drive to the axle shaft 80 through a constant velocity universal joint 150. The joint 150 is located between the upper and lower control arms and between the front and rear hydraulic cylinders 82, 84. The constant velocity joint 150 is shown in detail in FIGS. 10 and 11. The planet carrier 172 is coupled to a joint inner yoke 174 by a retaining disk 176 and bolt 178. The inner yoke 174 further has an external spline 180 that is fitted into the internal spline 182 of the planet carrier. The inner yoke 174 is supported in an outwardly projecting hub 184 of the inner suspension housing by a double tapered roller bearing set 186. The inner yoke 174 projects radially outward at the end of the hub 184 of the inner suspension housing and forms a reverse bend to extend axially inward, forming a collar 196 that surrounds the hub 184 of the inner suspension housing. The collar 196 extends axially inward beyond the outer edge of the bearing set 186.

The axle shaft 80 is splined to an outer yoke 190 and is also retained therein by a retaining disk 192 and bolt 194. The outer yoke 190 likewise projects radially outward and then forms a reverse bend to extend axially outward, forming a collar 198 surrounding the hub 160 of the axle housing 72. The collar 198 extends outward beyond the bearing 162. The inner and outer yokes 174, 190 are also referred to herein as drive and driven yokes respectively.

The constant velocity joint 150 is designed to locate the outer yoke 190 as close as possible to the inner yoke 174 to minimize the axial length of the constant velocity joint. Doing so provides room for the bearing support for the axle shaft 80 and enables the suspension assembly to be packaged within the narrow space available. The bearing requirements for supporting the axle shaft 80 and still enable a minimum 60 inch tread width results in little axial distance between the bearing 162 of the axle shaft 80 and the bearing set 186 of the inner yoke 174. The yokes 174, 190, with collars that wrap around the hubs of the inner suspension housing and the axle housing, allow the remaining components of the constant velocity joint to be located radially outward from the drive and driven shafts. This is in contrast to a typical double cardan universal joint where the components are arranged axially in line with the drive and driven shafts. In a preferred embodiment, the outboard face 175 of the inner yoke 174 is spaced from the inner face 191 of the outer yoke 190 by less than 2.54 cm (1 inch).

The collar 196 of the inner yoke 174 has two radially outwardly projecting studs 200, spaced diametrically opposite one another. The studs 200 define a first joint pivot axis 202. Likewise, the collar 198 of the outer yoke has two radially outwardly projecting studs 204, spaced diametrically opposite one another and defining a third joint pivot axis 206. The studs 200 and 204 and the axes 202 and 206 are parallel to one another.

Figure 11:
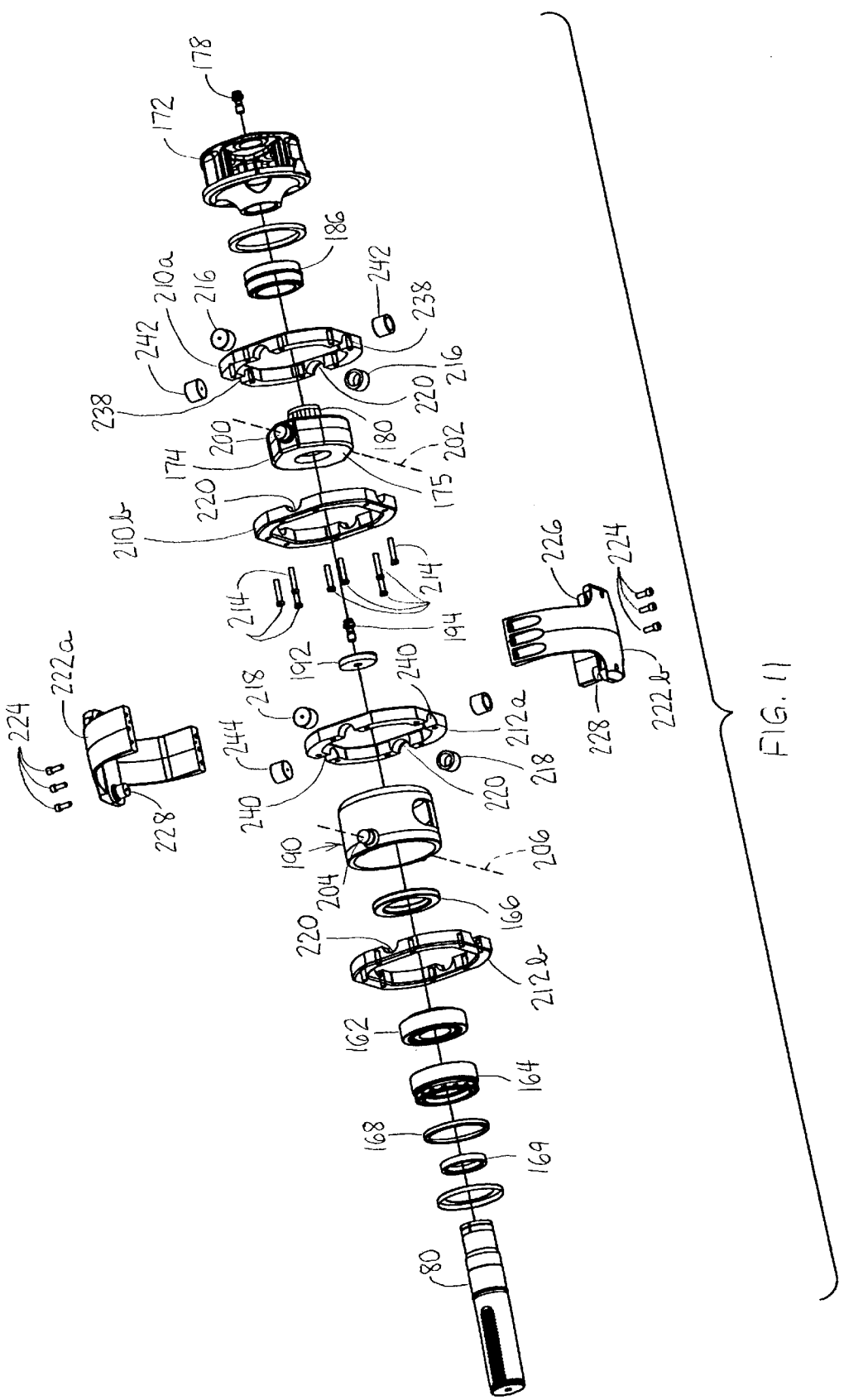
FIG. 11 is an exploded perspective view of the universal joint shown in FIG. 11.

The joint 150 further includes axially inner and outer annular "cross" or ring members 210, 212. The ring members are used in place of the cross-shaped members in a typical cardan universal joint. The ring or cross members are also referred to herein generically as "journal" members. The ring members 210, 212 are each formed of two half members 210a, 210b, and 212a, 212b. The half members are bolted together on radial planes by a plurality of bolts 214, only one set of which is shown in FIG. 11. When assembled, the ring members form bores 220 that hold bearing cups. A pair of bearing cups 216 are placed on the studs 200 of the inner yoke while a pair of bearing cups 218 are placed on the studs 204 of the outer yoke 190 to enable the ring members to pivot about the axes 202 and 206 respectively.

A two piece coupling yoke 222 has two halves 222a, 222b. The two halves are joined together on an axial plane by a plurality of bolts 224. The coupling yoke has four radially inwardly projecting studs, two axially inner studs 226 and two axially outer studs 228. The inner studs 226 define a second joint pivot axis 232 while the outer studs 228 define a fourth joint pivot axis 234. The inner studs 226 are captured in bores 238 formed by the inner ring member 210 while the outer studs 228 are captured in bores 240 in the outer ring member 212. Bearing cups 242, 244 are placed over the inner and outer studs 226, 228 respectively. Grease fittings 246 are provided for each of the bearing cups.

The joint 150 is a double cardan universal joint with the ring members connected by the coupling yoke. The suspension control arms control the movement of the axle housing relative to the inner suspension housing and keep the axis 81 of the axle shaft 80 generally parallel to the axis 170 of the inner yoke 174. This keeps the pivot angle at each of the ring members equal to one another so that a constant, or near constant, velocity output is achieved.

The universal joint is made axially compact by forming the cross members as rings to move the ring members and coupling yoke radially outward, to surround the drive and driven shafts. In this case, the bearing support for the axle shaft is inside the U-joint, axially between the two ring members. This enables the provision of a high torque capacity joint, while minimizing the axial length of the joint. High torque carrying capability is required since the joint is located outboard, or downstream, of the planetary final drive. This arrangement of a U-joint relative to the drive and driven shaft bearings is made possible by the configuration of the yokes, forming a collar that surrounds the hubs mounting the respective bearings.

It may also be possible to configure the universal joint with the journal members and the coupling yoke radially inward of the inner and outer yokes. Such an arrangement would still have bearings located axially between the joint pivot axes.

The first and second joint pivot axes 202, 232 are in a common plane that is inboard of the outer edge of the bearing set 186. Likewise, the third and fourth joint pivot axes 206, 234 are in a common plane that is outboard of the inner edge of the bearing 162.

Rear Wheel Steering

Figure 12:
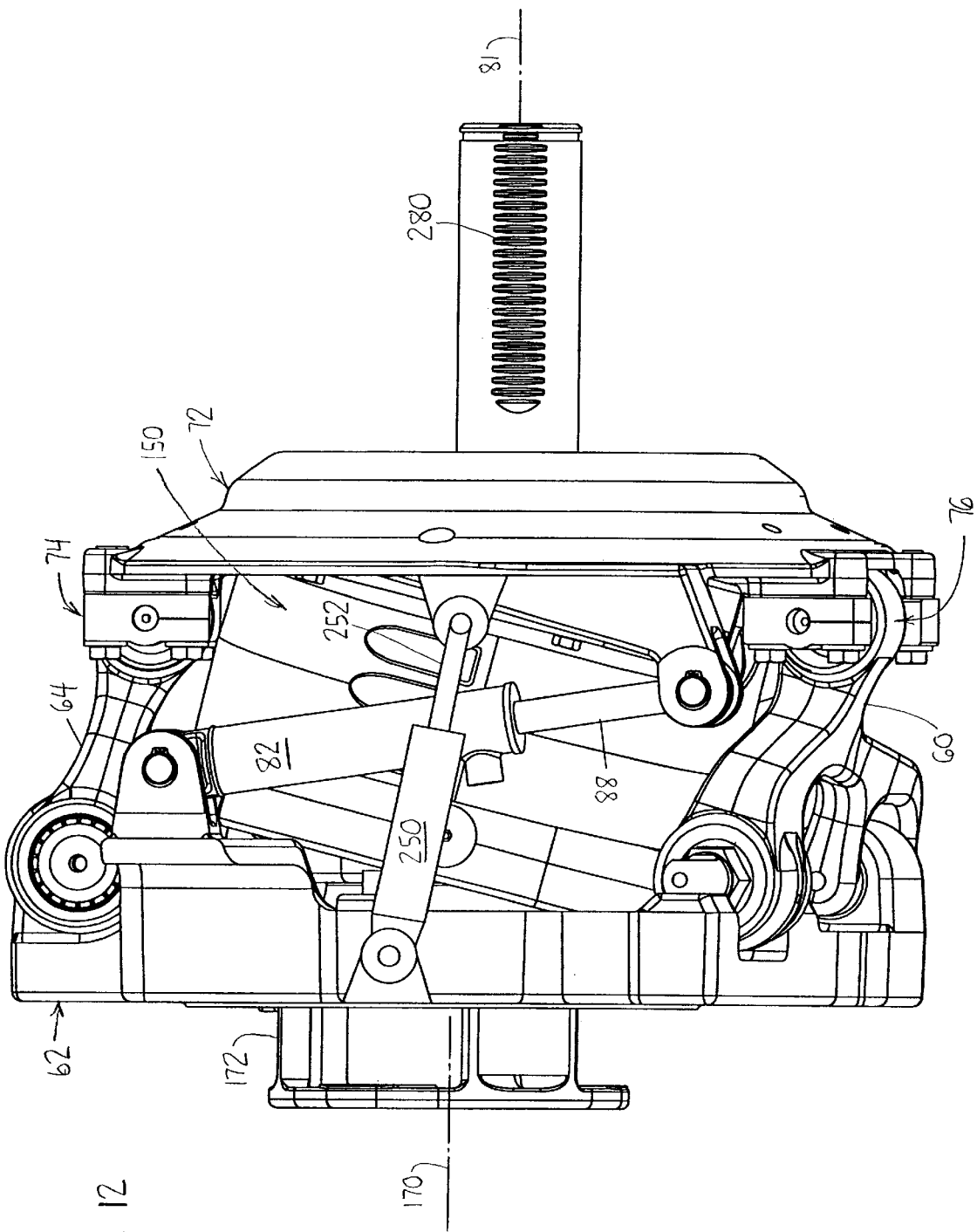
FIG. 12 is an elevational view of an alternative embodiment of the left suspension system including a rear wheel steering cylinder.

An alternative embodiment of the invention is shown in FIG. 12. The connecting link 96 described above has been replaced with a hydraulic cylinder 250 having a cylinder rod 252. The cylinder 250 is located forward of suspension cylinder 82 which passed through the fixed length connecting link 96. The rod 252 can be extended or retracted to change the distance between the inner suspension housing and axle housing forward of the axle shaft 80. This allows the axle suspension housing to rotate about the upright axis defined by the upper and lower ball joints 74, 76. This turns the rear wheels and tires, providing rear wheel steering to the tractor.

Tread Width Adjustment

Figure 13:
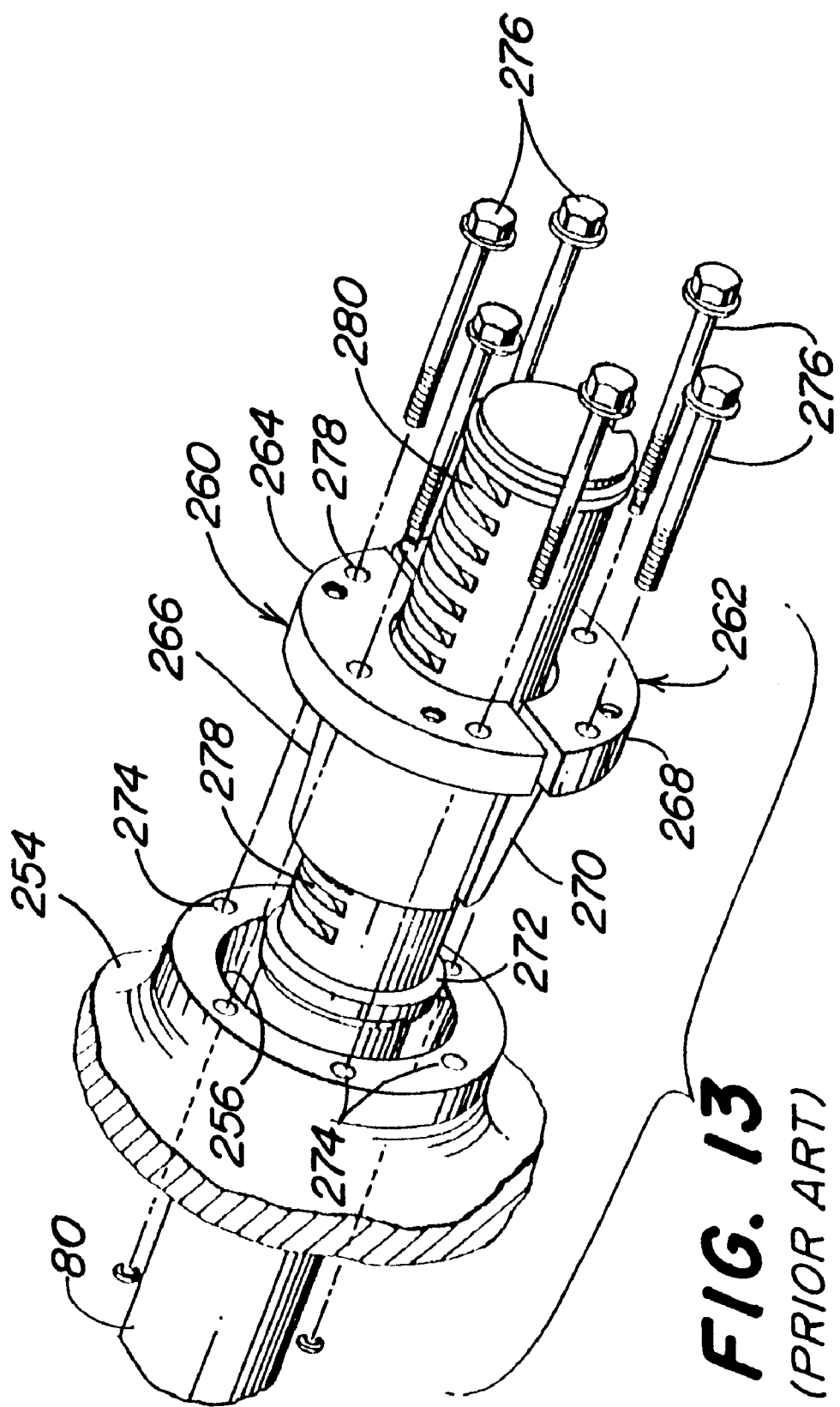
FIG. 13 is an exploded perspective view of an exemplary tread width adjustment mechanism for a wheel.

The tread width adjustment mechanism for the wheels is described with reference to FIG. 13. The axle shaft 80 supports an adjustable wheel assembly that includes a wheel hub 254. The wheel hub 254 has a tapered bore 256 large enough to accommodate the outside diameter of the shaft 80 and to provide an annular tapered bore in which upper and lower tapered flanged sleeves 260, 262 can be received in a wedging action within the tapered bore 256. The upper tapered flanged sleeve 260 has a radially extending, semi-circular flange 264 and a semi-conical, axially extending portion 266. The lower tapered flange sleeve 262 is of the same configuration as the upper sleeve 260, having a radially extending, semi-circular flange 268 and a semi-conical, axially extending portion 270. Together, the semi-conical portions 266, 270 provide a frusto-conical mounting surface for the hub 254. The sleeves 260, 262 have semi-cylindrical inner surfaces which, when tightened into position, encompass and clamp to the axle shaft 80.

An annular collar 272 is slidably positioned on the axle shaft 80 between the wheel hub 254 and the sleeves 260, 262 to maintain the wheel in a proper attitude and prevent binding after the sleeves 260, 262 have been loosened from the tapered bore 256. The hub 254 is provided with a plurality of angularly spaced threaded bolt bores 274. Bolts 276 are received within the bolt bores 274. The semi-circular flanges 264, 268 of the sleeves 260, 262 are provided with a plurality of angularly spaced bolt holes 278. When the bolts 276 are threaded into the bores 274 in the hub 254, the semi-conical portions 266, 270 are drawn into the tapered bore 256 and are clamped to the axle shaft 80. Any variety of clamping arrangements can be used with the axle shaft 80 as are well known in adjusting the tread width of an agricultural tractor wheels and tires.

The axle shaft 80 is formed with a plurality of teeth creating a rack 280 on the surface of the shaft. This rack is used with a spur gear, not shown, to move the wheel hub 254 along the length of the axle shaft 80. The clamp mechanism shown in FIG. 13 enables the wheels to be infinitely adjustable along the axle shaft 80.

Suspension Hydraulics

Figure 14:
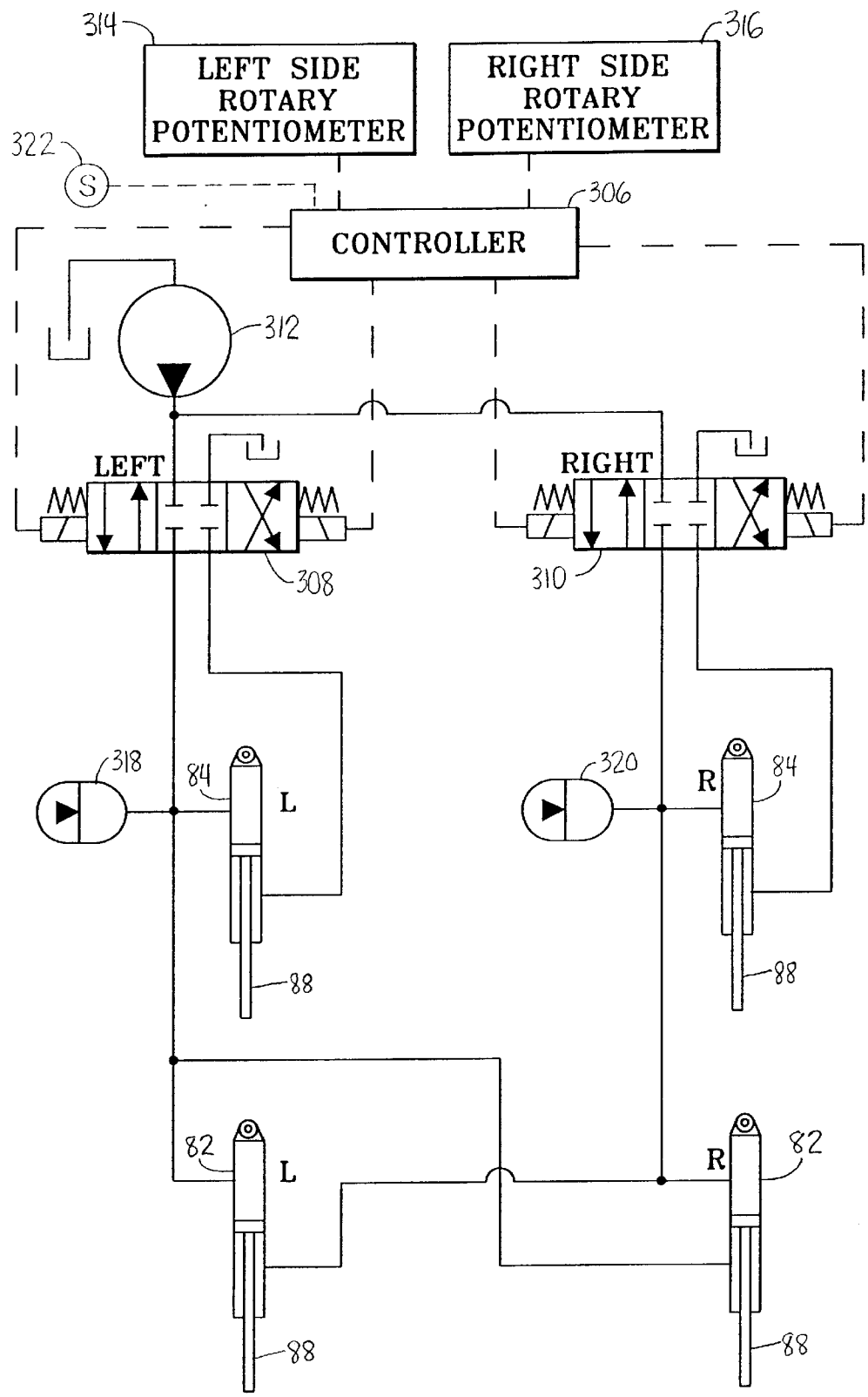
FIG. 14 is a simplified electro-hydraulic schematic.

A simplified schematic of the suspension hydraulic system is shown in FIG. 14. An electronic controller 306 controls the extension of the cylinder rods 88,. The controller 306 operates the solenoids of the left and right hydraulic valves 308, 310 to direct fluid from the pump 312 to the cylinders 82, 84 and back to the reservoir. The extension of the rods 88 is measured by left and right rotary potentiometers 314, 316. The potentiometers are located on the pivot pin 100 at the coupling of the upper control arm 64 to the inner suspension housing. The potentiometers measure the rotational position of the upper control arm, which is proportional to the rod extension. The valves 308, 310 are operated to extend or retract the rods for level control of the vehicle based on the vehicle load. Pressure accumulators 318, 320 provide a hydro-pneumatic spring system to the suspension. Multiple accumulators with different volumes and pre-loads can also be used.

A switch 322 is located at the operator's station 18 for actuation by the operator while positioned at the operator's station. The switch manually controls the suspension system to raise or lower the tractor rear end, and thus the hitch, at a relatively slow rate. The switch 322 is only operational when the tractor is stopped or moving at a slow speed, such as less than 2 or 3 kph. The switch is useful when connecting the tractor to an implement, particularly to the tractor drawbar 324 (FIG. 1). After an implement is unhitched, the jack stand often settles into the ground, lowering the implement tongue height. The switch 322 is used to lower the drawbar to a position beneath the implement tongue so that the implement need not be raised. After connecting the implement, the operator may raise the tractor rear end by the switch 322 or, if not, the suspension load leveling system will level the tractor once the tractor is in motion.

4-Wheel Drive Tractors

Figure 15:
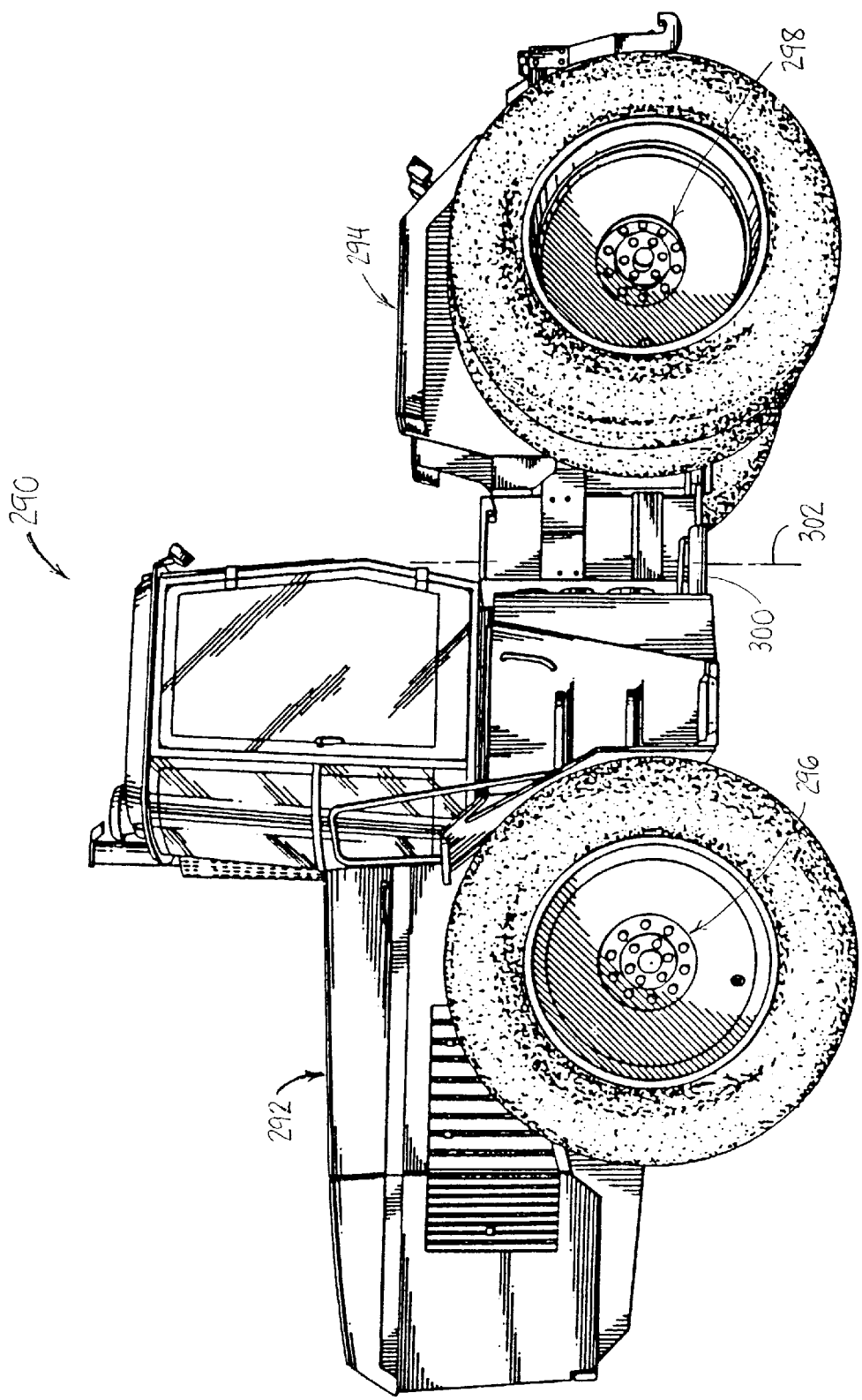
FIG. 15 is a side view of an articulated four-wheel drive tractor.

An articulated four-wheel drive tractor 290 is shown in FIG. 15. The tractor 290 includes a front and rear portion 292 having a front drive axle 296 and a rear portion 294 having a rear drive axle 298. The front and rear portions are joined to one another by a coupling 300 to articulate about an upright axis 302 for steering. This type of 4-wheel drive tractor is well known. The tractor 290 is a 9000 series 4-wheel drive tractor available from John Deere.

The front and rear drive axles 296, 298 are similar to the axle shown in FIG. 2, having a central differential case, inboard planetary final drives and left and right axle housings projecting laterally outward to support axle shafts. Both the front and rear drive axles 296, 298 can be equipped with the suspension of the present invention. The laterally projecting axle housings are replaced with the inner suspension housings of the present invention. The suspension system including the upper and lower control arms and the axle housings are mounted to the inner suspension housings as described above. The axle shafts are driven through the universal joint described above. The provision of the suspension axles can improve operator comfort and provide for faster travel speeds. In addition, by allowing the drive wheels to move up and down relative to the tractor frame, the joint 300 can be simplified. The joint will no longer have to allow the front and rear portions of the tractor to roll relative to one another.

The present invention has been described as having a differential case to which the suspension components are attached with the suspension including left and right inner suspension housings rigidly coupled to the differential case. In a conventional row crop tractor the differential case is part of the powertrain that includes the engine, transmission and differential. These components may be mounted to a frame structure to which the front axle and operator's station is then mounted or they may, themselves, form the vehicle frame structure. The control arms and hydraulic cylinders may be attached to the differential case, the inner suspension housings, the central housing or to the vehicle frame structure. The claim language that follows is thus to be broadly construed with this in mind.

While the invention has be described in the context of a wheeled tractor, it is possible to provide the suspended rear drive wheels on a track driven tractor. This could be either a friction or mechanical drive track.

The drive axle suspension of the present invention provides a tractor with a drive axle that is suspended. The suspended axle can be used as the rear axle in a row crop tractor that maintains the characteristics of a non-suspended row crop tractor. In addition, the suspended axle can be used as either the front or the rear axle of an articulated 4-wheel drive tractor.

The invention should not be limited to the above-described embodiment, but should be limited solely by the claims that follow.

We claim:

1. A universal joint for transmitting rotary power:
   a drive member rotatably supported in a first housing by a first bearing set for rotation about a first longitudinal axis;
   a driven member rotatably supported in a second housing by a second bearing set for rotation about a second longitudinal axis;
   a drive yoke fixed to the drive member;
   a first journal member coupled to the drive yoke for pivotal motion about a first joint pivot axis transverse to a longitudinal axis of the drive member;
   a coupling yoke joined to the first journal member for pivotal motion about a second joint pivot axis transverse to the longitudinal axis of the drive member and to the first joint pivot axis and lying in the same plane as the first joint pivot axis;
   a driven yoke fixed to the driven member;
   a second journal member coupled to the driven yoke for pivotal motion about a third joint pivot axis transverse to the second longitudinal axis; and
   the second journal member being joined to the coupling yoke for pivotal motion about a fourth joint pivot axis transverse to the second longitudinal axis and to the third joint pivot axis and lying in the same plane as the third joint pivot axis; and
   at least a portion of the first and second bearing sets being located between the plane of the first and second joint pivot axes and the plane of the third and fourth joint pivot axes.

2. The universal joint as defined by claim 1 wherein the first and second journal members and the coupling yoke radially surround the drive and driven yokes.

3. The universal joint as defined by claim 1 wherein the first and second journal members are each two piece members with the two pieces of each journal member joined together along radially extending planes.

4. The universal joint as defined by claim 1 wherein the coupling yoke is a two piece member joined together along an axially extending plane.

* * * * *